United States Patent
Otani et al.

(10) Patent No.: US 8,237,895 B2
(45) Date of Patent: Aug. 7, 2012

(54) LIQUID CRYSTAL DISPLAY DEVICE AND METHOD OF MANUFACTURING THE SAME

(75) Inventors: Miharu Otani, Yokohama (JP); Jun Tanaka, Kawasaki (JP); Kazuhito Masuda, Hitachi (JP); Masaya Adachi, Hitachi (JP); Takato Hiratsuka, Mito (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 793 days.

(21) Appl. No.: 12/336,570

(22) Filed: Dec. 17, 2008

(65) Prior Publication Data
US 2009/0153781 A1 Jun. 18, 2009

(30) Foreign Application Priority Data
Dec. 17, 2007 (JP) ................. 2007-324737

(51) Int. Cl.
G02F 1/1335 (2006.01)
(52) U.S. Cl. ........................................................ 349/114
(58) Field of Classification Search .................. None
See application file for complete search history.

(56) References Cited

U.S. PATENT DOCUMENTS

| | | | |
|---|---|---|---|
| 4,676,868 A * | 6/1987 | Riley et al. ............. | 438/697 |
| 5,739,296 A | 4/1998 | Gvon et al. | |
| 6,411,354 B1 * | 6/2002 | Lavrentovich et al. ......... | 349/84 |
| 2002/0075423 A1 * | 6/2002 | Fujino ............. | 349/43 |
| 2002/0171779 A1 * | 11/2002 | Kimura et al. ............. | 349/39 |
| 2003/0134133 A1 * | 7/2003 | Kimura et al. ............. | 428/469 |
| 2003/0218664 A1 | 11/2003 | Sakamoto et al. | |
| 2006/0125986 A1 * | 6/2006 | Choo et al. ............ | 349/114 |
| 2008/0252824 A1 | 10/2008 | Kadowaki et al. | |

FOREIGN PATENT DOCUMENTS

| | | |
|---|---|---|
| JP | 08-511109 | 11/1996 |
| JP | 2003-344837 | 12/2003 |
| JP | 2005-250430 | 9/2005 |
| JP | 2006-171723 | 6/2006 |
| JP | 2006-184325 | 7/2006 |
| JP | 2006-309185 | 11/2006 |
| WO | WO 94/28073 | 12/1994 |

* cited by examiner

*Primary Examiner* — Lucy Chien
(74) *Attorney, Agent, or Firm* — Antonelli, Terry, Stout & Kraus, LLP.

(57) ABSTRACT

In a transflective liquid crystal display device including a transmission display portion and a reflection display portion, a dichroic ratio of a polarizing layer contained in a reflection region is increased to enhance display performance. The liquid crystal display device includes: the transmission display portion and the reflection display portion which are formed for each pixel; a reflective layer formed in the reflection display portion; a first substrate having a principal surface opposed to a liquid crystal layer; a second substrate opposed to the first substrate via the liquid crystal layer; and a polarizing layer formed above the reflective layer via an underlying layer thereof on the principal surface of the first substrate. The polarizing layer is made of chromonic liquid crystalline molecules, and an interface between the polarizing layer and the underlying layer has one of a siloxane structure and a silazane structure.

10 Claims, 5 Drawing Sheets

LIQUID CRYSTAL DISPLAY DEVICE AND METHOD OF MANUFACTURING THE SAME

CROSS-REFERENCE TO RELATED APPLICATION

The present application claims priority from Japanese application JP 2007-324737 filed on Dec. 17, 2007, the content of which is hereby incorporated by reference into this application.

BACKGROUND OF THE INVENTION

1. Field of the Invention

The present invention relates to a liquid crystal display device, and more particularly, to a transflective liquid crystal display device including both a reflection display portion and a transmission display portion and a method of manufacturing the transflective liquid crystal display device.

2. Description of the Related Art

A liquid crystal display device has advantages such as thinness, light-weight, and low power consumption, compared with a cathode ray tube (CRT) which has been a mainstream of a display device conventionally, and the application of the liquid crystal display device has been enlarged as a display device for various electronic appliances. Among them, in a display device for a portable information appliance, there is a demand for the enhancement of visibility in various environments including indoor places and dark places with no light source present outside and places with high illuminance such as outdoor places under the clear sky, and a transflective liquid crystal display device including a transmission display portion and a reflection display portion in one pixel has come to be used widely.

In a transflective liquid crystal display device, the brightness is constant irrespective of an environment due to the use of a backlight in a transmission display portion, and hence a satisfactory display is obtained in relatively dark environments including indoor places to dark rooms. On the other hand, in a reflection display portion, the contrast is constant irrespective of the lightness of an outside since light from an outside is reflected by a reflective plate contained in the device to perform a display, and hence a satisfactory display is obtained in relatively light environments including outdoor places under the clear sky to indoor places.

On the other hand, as a liquid crystal display device with a large viewing angle, a liquid crystal display device of an in-plane switching (IPS) system has been known conventionally. However, when the IPS system is applied to a transflective liquid crystal display device, there arises a problem in that a black display is not obtained in a reflection portion. In order to solve this problem, JP 2006-184325 A realizes a reflection type display and a transmission type display by containing a polarizing layer.

Further, JP 2006-171723 A describes a transflective liquid crystal display device in a twisted nematic (TN) mode. Even in this transflective liquid crystal display device, both a reflection display and a transmission display are realized by containing a polarizing layer.

The polarizing layers contained in the devices in JP 2006-184325 A and JP 2006-171723 A are formed by applying a coating liquid containing a lyotropic liquid crystal as described in Japanese Patent Translation Publication No. 8-511109 as a polarizing material, followed by curing.

Table 1 of JP 2006-171723 A describes optical properties of a thin crystal film (TCF) manufactured by Optiva Inc., which is a solution made of a chromonic liquid crystal, and a dichroic ratio thereof (D=ln(perpendicular transmittance)/ln (parallel transmittance)) is calculated from the optical properties to be about 3 to 6. Further, the dichroic ratio of a polarizing film described in Table 1 of Japanese Patent Translation Publication No. Hei 8-511109 is 7 to 23. On the other hand, a commercially available polarizing film using iodine (polarizing film SEG1425DU, manufactured by Nitto Denko Corporation) has a dichroic ratio of 78, and a general commercially available polarizing film using iodine has a dichroic ratio of 70 to 80. Thus, an organic colorant film has much poor dichroic ratio, compared with that using iodine.

In a polarizing player to be contained in a transflective liquid crystal display device, the enhancement of a contrast ratio can be expected as a dichroic ratio becomes larger, and hence there is a demand for further enhancement of properties of a polarizing film in order to enhance image quality.

SUMMARY OF THE INVENTION

In order to solve the above problems, the invention of the present application is configured, for example, as follows.

Specifically, according to a first aspect of the present invention, there is provided a liquid crystal display device including:

a transmission display portion and a reflection display portion which are formed for each pixel;

a reflective layer formed in the reflection display portion;

a first substrate having a principal surface opposed to a liquid crystal layer;

a second substrate opposed to the first substrate via the liquid crystal layer; and a polarizing layer formed above the reflective layer via an underlying layer over the principal surface of the first substrate, the polarizing layer being made of chromonic liquid crystalline molecules, in which an interface between the polarizing layer and the underlying layer has one of a siloxane structure and a silazane structure.

Further, according to a second aspect of the present invention, there is provided a liquid crystal display device including:

a liquid crystal layer interposed between a first substrate and a second substrate opposed to each other;

a thin film transistor circuit as a switching element;

a reflection display portion and a transmission display portion;

a light-transparent pixel electrode and a light-transparent common electrode which are laminated above the first substrate via an insulating film, with the pixel electrode placed as an upper layer and the common electrode placed as a lower layer;

a color filter formed on the second substrate;

a non-light-transparent reflective plate formed under the common electrode in a reflection display region of the first substrate;

an organic polymer layer formed on the reflective plate and having an oxidized surface;

a layer having one of a siloxane structure and a silazane structure on a surface of the organic polymer layer;

a polarizing layer made of chromonic liquid crystalline molecules between the common electrode and the reflective plate; and an organic insulating film covering the polarizing layer.

Further, the layer having one of a siloxane structure and a silazane structure on the surface of the organic polymer layer is made of one of a compound having a molecular structure of the following Formula (1) and a compound having a molecular structure of the following Formula (2):

$$X\text{—}C_nH_{2n}\text{—}OR \quad (1)$$

$$R'_3SiNHSiR'_3 \quad (2)$$

(where, in Formula (1), X represents an organic group selected from the group consisting of a vinyl group, an epoxy group, an amino group, a methacryl group, a mercapto group, a sulfide group, a ureide group, a methacryloxy group, an acryloxy group, and a ketimino group; R represents an organic group selected from the group consisting of a methyl group, an ethyl group, and an acetyl group; and n represents an integer of 1 to 3. In Formula (2), R' is a monovalent hydrocarbon group having, preferably, 1 to 4 carbon atoms, and more preferably 1 to 2.)

Further, according to a third aspect of the present invention, there is provided a liquid crystal display device including:

a liquid crystal layer interposed between a first substrate and a second substrate opposed to each other;

a thin film transistor circuit as a switching element;

a reflection display portion and a transmission display portion;

a light-transparent pixel electrode and a light-transparent common electrode which are laminated above the first substrate via an insulating film, with the light-transparent pixel electrode placed as an upper layer and the light-transparent common electrode placed as a lower layer;

a color filter formed on the second substrate;

a non-light-transparent reflective plate formed under the common electrode in a reflection display region of the first substrate;

an inorganic insulating film layer formed above the reflective plate;

a polarizing layer made of chromonic liquid crystalline molecules between the common electrode and the reflective plate; and an organic insulating film covering the polarizing layer.

Further, the inorganic insulating comprises a compound having one of a siloxane structure and a silazane structure.

In the liquid crystal display device of the present invention, the surface of the underlying layer of the polarizing layer has one of a siloxane structure and a silazane structure, and a coating property of the polarizing layer is enhanced by the interaction between a hydrophilic group and a polar group on the surface of the underlying layer and a solution made of a chromonic liquid crystal, whereby the enhancement of a dichroic ratio can be realized.

DETAILED DESCRIPTION OF THE INVENTION

Hereinafter, examples of embodiments to which the present invention is applied are described with reference to the drawings. In the following, the configuration of a liquid crystal display device is described by way of manufacturing steps thereof in some cases.

First Embodiment

Figure 1:
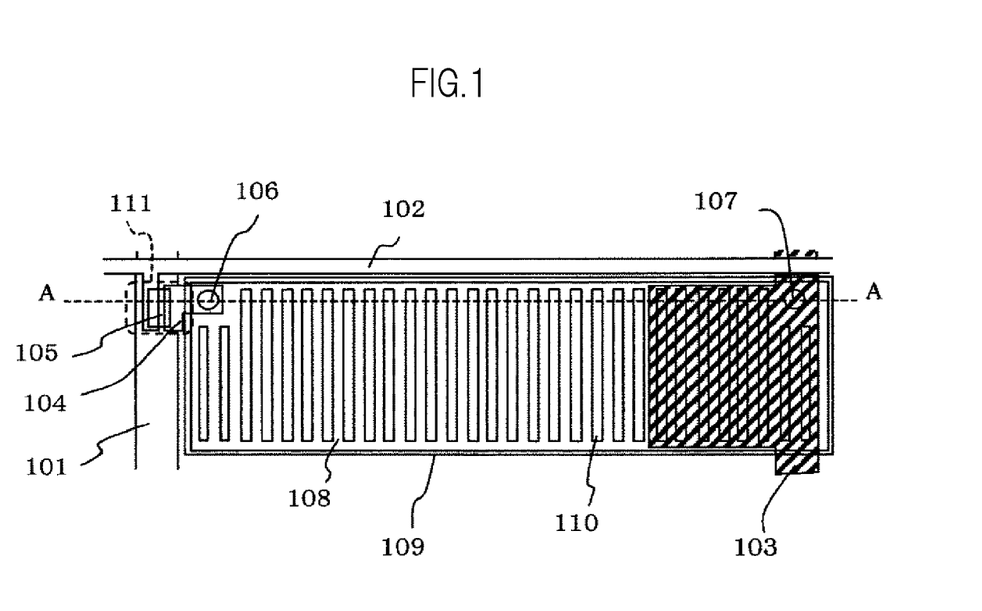
FIG. 1 is a pixel region plan view for describing a liquid crystal display device according to the present invention.
Figure 2:
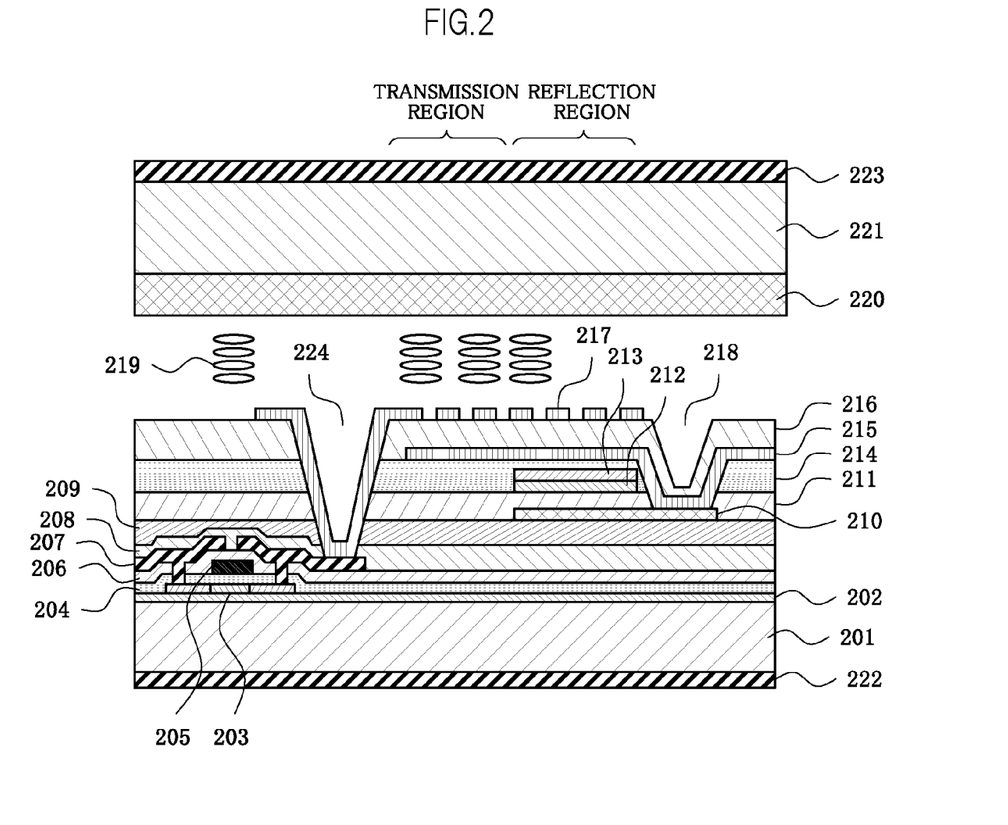
FIG. 2 is a pixel region cross-sectional view illustrating a liquid crystal display device according to the present invention.

FIG. 1 is a top view of one pixel constituting a liquid crystal display device of this embodiment. FIG. 2 is a cross-sectional view taken along a line A-A of FIG. 1. In FIGS. 1 and 2, the liquid crystal display device according to the present invention is illustrated as a transflective liquid crystal display device of an IPS system, but the present invention can also be applied to a transflective liquid crystal display device other than the IPS system.

As illustrated in FIG. 2, the liquid crystal display device of the present invention mainly includes a first substrate and a second substrate opposed to each other, and a liquid crystal layer sandwiched between the opposed first substrate and second substrate.

On a transparent substrate serving as a first substrate 201, a switching element is formed.

The switching element is formed of a thin film transistor having a semiconductor layer made of polysilicon, amorphous silicon, or an organic substance. Herein, as an example, the case using a thin film transistor made of polysilicon is described. However, the present invention is not limited thereto.

A switching element 105 made of a polysilicon thin film transistor includes a gate insulating layer 204, a gate electrode 205, an inter-layer insulating layer 206, an electrode layer 207, and a first insulating layer 208 on a polysilicon layer including a semiconductor layer 203 serving as a source/drain region and a channel region.

In order to prevent mixing of ions such as Na and K in the semiconductor layer 203 and the gate insulating layer 204 from the first transparent substrate 201, an underlying layer 202 may be provided between the switching element and the first transparent substrate 201. The underlying layer 202 has a configuration in which a layer made of silicon nitride and a layer made of silicon oxide are laminated in the stated order from the first transparent substrate 201 side.

The gate insulating layer 204 and the inter-layer insulating layer 206 are made of, for example, silicon oxide. The first insulating layer 208 is made of, for example, silicon nitride.

For the electrode layer 207, a metal electrode material may be used, and for example, there can be used a film with a three-layered structure in which an aluminum layer is sandwiched between titanium (Ti) and tungsten (W). However, the electrode layer 207 is not limited thereto.

The electrode layer 207 is connected respectively to the source region and the drain region of the semiconductor layer 203 through an opening formed in the inter-layer insulating layer 206.

A thin film transistor 111 is connected to a scanning line 101, a signal line 102, and a pixel electrode 108.

The first substrate 201 further includes a common line 103 and a common electrode 109. The scanning line 101 and the signal line 102 cross each other, and the thin film transistor 111 is present in the vicinity of a crossing portion thereof.

The common line 103 formed on the first substrate 201 together with the thin film transistor 111 is peculiar to the liquid crystal display device of an IPS system in which the common electrode 109 is formed on the first substrate 201. The above-mentioned reflection display portion including the common line 103 is not seen in a transflective liquid crystal display device of a TN system or a VA system.

On the switching element, a second insulating layer 209 is provided. The second insulating layer 209 has a function of flattening a bump caused by the switching element and the wiring, and may also have a function of imparting an uneven shape to a reflective layer described later.

In order to flatten the step difference, it is desirable to use a material capable of forming a layer in a solution state. Thus, for the second insulating layer 209, an organic material or an inorganic material capable of being dispersed in a solvent and applied to form a film can be used. Further, in the case where the step in which the second insulating layer 209 imparts an uneven shape to the surface thereof is required, there is an advantage that the step can be simplified if a material itself has photosensitivity.

Further, for the second insulating layer 209, it is desirable to use a transparent material with a small absorptivity with respect to visible light so as to efficiently pass light from a backlight in a transmission region. Thus, for the second insulating layer 209, it is desirable to use an organic material such as photosensitive polyimide and an acrylic resin.

A surface of the second insulating layer 209 may have an uneven shape so as to impart an uneven shape to the surface of the reflective layer in the reflection region. The uneven shape may be realized by forming an uneven pattern by photolithography, followed by melting with an increase in temperature, or may be realized by using a half-tone mask during an exposure step. On the other hand, the surface of the second insulating layer 209 is flattened in a transmission region.

On the second insulating layer 209, a reflective plate 210 is formed in a portion corresponding to the reflection region. If a metal material with a high reflectance such as aluminum and silver is used for the reflective plate 210, the reflective plate 210 has a high reflectance, and wiring can also be formed, which is advantageous. The reflective plate 210 is removed from the transmission region by photolithography. When an uneven shape is formed on the surface of the second insulating layer 201 underlying the reflective plate 210, the formed uneven shape is reflected onto the reflective plate 210, whereby the surface of the reflective plate 210 has an uneven shape. Due to the uneven shape of the reflective plate 210, an angle at which light incident upon a liquid crystal display panel from outside is reflected by the reflective plate 210 is enlarged, which makes a reflection display brighter during an actual use. When the reflective plate is allowed also to function as the wiring such as the common line 103, there is obtained an effect of reducing the production steps required for the reflective plate and the wiring.

An underlying layer 211 is provided on the reflective plate 210. In the case where the reflective plate 210 has an uneven shape, the underlying layer 211 has a function as a flattening layer for preventing the optical performance of a polarizing layer 212 formed in an upper layer from being degraded due to the uneven shape of the reflective plate 210. That is, the underlying layer 211 functions as a layer for flattening an underlying surface on which the polarizing layer 212 is formed. By providing the underlying layer 211, the optical performance of the polarizing layer 212 is suppressed from being degraded, which can contribute to a display of a brighter image with a more enhanced contrast ratio.

It is desirable that the underlying layer 211 be made of an insulating material, which is capable of forming a layer in a solution state and which is a transparent material with a small absorptivity with respect to visible light. That is, similarly to the second insulating layer 209, it is possible to use an organic material such as a polyimide-based resin or an acrylic resin, other commercially available photosensitive polymer material, or an inorganic material capable of being dispersed in a solvent and applied to form a film.

In an upper layer of the reflective plate 210, the polarizing layer 212 is formed via the underlying layer 211. The polarizing layer 212 can be formed by applying, for example, a solution containing C.I. Direct Blue 67 manufactured by Nippon Kayaku Co., Ltd. as a chromonic mesogen. As a material for forming the polarizing layer, a solution containing a chromonic mesogen having a molecular structure represented by the following Formulae (3) to (20) may be used in addition to the above-mentioned solution, and the polarizing layer is not limited thereto.

[Chemical Formula 1]

(3)

(4)

(5)

-continued

(6)

(7)

(8)

(9)

(10)

(11)

(12)

(13)

[Chemical Formula 2]

(14)

(15)

In Formula (14): M represents a cationic species; R' represents H or Cl; R represents H, an alkyl group, ArNH, or ArCONH; and Ar represents a substituted or unsubstituted aryl group. Further, in Formula (15): M represents a cationic species; R represents H, an alkyl group, halogen, or an alkoxy group; Ar represents a substituted or unsubstituted aryl group; and n represents 2 or 3.

In Formula (16): M represents a cationic species; R represents H, an alkyl group, halogen, or an alkoxy group; Ar represents a substituted or unsubstituted aryl group; and n represents 2 or 3. Further, in Formula (17), M represents a cationic species.

[Chemical Formula 3]

(16)

[Chemical Formula 4]

(18)

(17)

(19)

In Formula (18): M represents a cationic species; R represents H, an alkyl group, halogen, or an alkoxy group; Ar represents a substituted or unsubstituted aryl group; and n is 2 or 3. Further, in Formula (19), M represents a cationic species.

[Chemical Formula 5]

(20)

In Formula (20), M represents a cationic species, and n represents 3, 4, or 5.

In the case where the underlying layer 211 is made of an organic polymer, before the polarizing layer 212 is applied thereto, the surface of the underlying layer 211 is subjected to oxidation treatment by being exposed to, for example, oxygen plasma. The oxidation treatment may be performed by UV-ozone treatment, ozone oxidation treatment, or oxygen ashing treatment. Further, for example, a compound having a molecular structure represented by the following Formula (1) or a compound having a molecular structure represented by the following Formula (2) is applied onto the underlying layer 211, followed by sintering, whereby a layer having a siloxane structure or a silazane structure is formed.

$$X-C_nH_{2n}-OR \quad (1)$$

$$R'_3SiNHSiR'_3 \quad (2)$$

In Formula (1), X represents an organic group selected from the group consisting of a vinyl group, an epoxy group, an amino group, a methacryl group, a mercapto group, a sulfide group, a ureide group, a methacryloxy group, an acryloxy group, and a ketimino group; R represents an organic group selected from the group consisting of a methyl group, an ethyl group, and an acetyl group; and n represents an integer of 1 to 3. In Formula (2), R' represents a monovalent hydrocarbon group, preferably, 1 to 4 carbon atoms, and more preferably 1 or 2.

Next, the polarizing layer 212 is applied to the underlying layer 211. For applying the polarizing layer 212, for example, a slit die coater may be used. The slit die coater can stretch a polarizing layer material in a solution state in a coating direction under a pressure to the material while supplying the material to a coating surface. As a result of the step, a dye is aligned and solidified by drying, whereby a polarizing layer can be formed.

The polarizing layer 212 does not have 100% transparency. Therefore, the amount of light passing through the polarizing layer decreases, the brightness of the transmission portion decreases, and the contrast ratio of the transmission portion is also influenced, with the result that display quality in the transmission portion is degraded. Therefore, it is desirable that the polarizing layer 212 be not formed in the transmission region.

A protective layer 213 may be provided for the purpose of suppressing the polarizing layer 212 from being degraded during the step performed after the formation of the polarizing layer, or for the purpose of preventing impurities from exuding from the polarizing layer 212 to contaminate other structures. For the protective layer 213, a material transparent to visible light is suitable, and a polyimide-based or acrylic transparent resin material, other commercially available photosensitive polymer material, or a transparent inorganic material such as silicon oxide or silicon nitride can be used. In particular, if high performance is required as the protective layer, silicon nitride capable of forming a dense layer is preferable.

In the case of removing the polarizing layer 212 from the transmission region by, for example, photolithography, even after the polarizing layer is removed from the transmission region using a transparent photosensitive resist material as a resist material, the resist material is left on the polarizing layer 212, whereby the protective layer 213 may be formed. In this case, there is an effect that the number of steps can be decreased.

The protective layer 213 is formed by applying a material thereof onto the polarizing layer 212. For applying the material, a slit coater, an inkjet apparatus, or the like can be used. In the case of using the slit coater, the material is applied over the entire surface of the polarizing layer 212. In the case of using the inkjet apparatus, the material can be applied to only a region corresponding to the reflective plate 210. A protective layer is prebaked and exposed to light using a desired photomask, and the protective layer of the region exposed to light is removed with an alkaline solution that is an aqueous solution of tetramethyl ammonium hydroxide. At this time, the polarizing layer present in a lower layer of the protective layer can also be removed with the alkaline solution. Thus, there can be obtained a pattern in which the material for the protective layer 213 is laminated on the polarizing layer 212 in the region corresponding to the reflective plate 210.

The entire surface of the material for the protective layer 213 is exposed to light to photolyze a photosensitizer contained in the material, whereby the transparency can be enhanced. The resultant material is cured by heating to obtain the protective layer 213.

A third insulating layer 214 is formed so as to cover the entire region devoid of the protective layer 213 and the reflective plate 210. For the third insulating layer 214, a material transparent to visible light is suitable, and a polyimide-based or acrylic transparent resin material, other commercially available photosensitive polymer material, or a transparent inorganic material such as silicon oxide or silicon nitride can be used.

In the case of forming first through-holes 107, 218 in the underlying layer 211 for bringing the common electrode 215 into conduction with the reflective plate 210, for example, by photolithography, a transparent photosensitive resist material is used as a resist material, and the resist material is left on the protective layer 213 even after the formation of the first through-holes 107, 218, whereby the third insulating layer 214 may be formed. In this case, there is an effect that the number of steps can be decreased.

In both the reflection region and the transmission region, the common electrodes 109, 215 are formed in portions positioned in an upper layer of the polarizing layer 212. That is, the common electrodes 109, 215 are formed irrespective of the presence/absence of the polarizing layer 212 in the transmission region.

The common electrodes 109, 215 are formed of a transparent conductive material. For the common electrodes 109, 215, for example, indium tin oxide (ITO) is preferred, and other transparent conductive materials such as InZnO and ZnO can also be used. Those materials have a high electric conductivity to some degree and have a function of transmitting visible light.

A fourth insulating layer 216 is formed in an upper layer of the common electrodes 109, 215, and pixel electrodes 108, 217 are formed thereon. For the fourth insulating layer 216, an insulating material transparent to visible light is preferred, and a polyimide-based or acrylic transparent resin material, other commercially available photosensitive polymer material, or a transparent inorganic material such as silicon oxide or silicon nitride can be used.

In the case of forming second through-holes 106, 224 passing through the first insulating layer, the second insulating layer, the underlying layer, and the third insulating layer for conduction with the pixel electrode and the thin film transistor 111, for example, by photolithography, a transparent photosensitive resist material is used as a resist material, and the resist material is left on the common electrodes 109, 215 even after the formation of the second through-holes 106, 224, whereby the fourth insulating layer 216 may be formed. In this case, there is an effect that the number of steps can be decreased.

It is desirable that the pixel electrodes 108, 217 be formed of a transparent conductive material, and similarly to the common electrodes 109, 215, for example, indium tin oxide (ITO) is preferred and other transparent conductive materials such as InZnO and ZnO can also be used. Those materials have a high electric conductivity to some degree and have a function of transmitting visible light. Further, the pixel electrodes 108, 217 are connected to the electrode layer 207 constituting the switching element through openings (second through-holes) 106, 224 passing through the fourth insulating layer 216, the third insulating layer 214, the underlying layer 211, the second insulating layer 209, and the first insulating layer 208. The second through-holes 106, 224 are filled directly with the same conductive material as that for the pixel electrode. Alternatively, for the purpose of ensuring the electric connection of the electrode material constituting the electrode layer 207, and the pixel electrodes 108, 217, an intermediate layer made of a conductive material (not shown) may be provided.

The common electrodes 109, 215 are completely separated from the pixel electrodes 107, 217 so as not to come into contact therewith by providing openings at positions corresponding to the second through-holes 106, 224.

Also in the case where the reflective plate 210 is made of a conductive material, the reflective plate 210 is completely separated from the pixel electrodes 108, 217 so as not to come into contact therewith through the second through-holes 106, 224 by providing openings at positions corresponding to the second through-holes 106, 224.

An alignment film (not shown) for liquid crystal containing a polyimide material as a main component is formed on the fourth insulating layer 216 and the pixel electrodes 108, 217 so as to cover the fourth insulating layer 216 and the pixel electrodes 108, 217. The alignment film can be formed by flexographic printing or an inkjet coating film formation method.

Thus, an alignment film (not shown) for liquid crystal is formed on the substrate surface.

As a counter substrate, a transparent substrate 221 on which a color filter layer 220 is formed is prepared. The color filter layer has a stripe-shaped pattern of red, green, and blue, and each stripe is parallel to the signal line 102.

An alignment film for liquid crystal (not shown) is formed on the color filter layer 220.

A liquid crystal layer 219 is sandwiched between the first substrate and the second substrate formed as described above to form a liquid crystal cell.

External polarizing plates 222, 223 are attached to both outer surfaces of the substrates of the liquid crystal cell, and are combined with a backlight unit (not shown) serving as a light source, whereby a liquid crystal display device can be obtained.

The liquid crystal display device includes both a transmission portion that transmits backlight to be used for a display and a reflection portion that reflects external light inside to be used for a display.

The liquid crystal alignment film (not shown) is placed close to the liquid crystal layer 219 to define an alignment direction thereof.

The pixel electrode 217 and the common electrode 215 are partitioned by the fourth insulating layer 216, and an electric field is formed between the pixel electrode 217 and the common electrode 215 during the application of a voltage. The electric field is distorted in an arc shape by the influence of the fourth insulating layer and passes through the liquid crystal layer. Consequently, the alignment of the liquid crystal layer is changed during the application of a voltage.

The common electrode 103 protrudes into the pixel electrode 108 in a portion crossing the pixel electrode 108, and reflects light. In FIGS. 1 and 2, a portion in which the common line overlaps the pixel electrode corresponds to a reflection display portion, and the remaining portion in which the pixel electrode overlaps the common electrode corresponds to a transmission display portion.

In the above description, even in the case of using an inorganic insulating film layer made of a compound having a siloxane structure or a silazane structure in an underlying layer of the polarizing layer, a similar liquid crystal display device can be obtained.

As described above, the surface of the underlying layer of the polarizing layer has a siloxane structure, whereby the dichroic ratio of the polarizing plate made of chromonic liquid crystalline molecules can be enhanced, and the enhancement of image quality of a transflective liquid crystal display device can be achieved.

Second Embodiment

Figure 3:
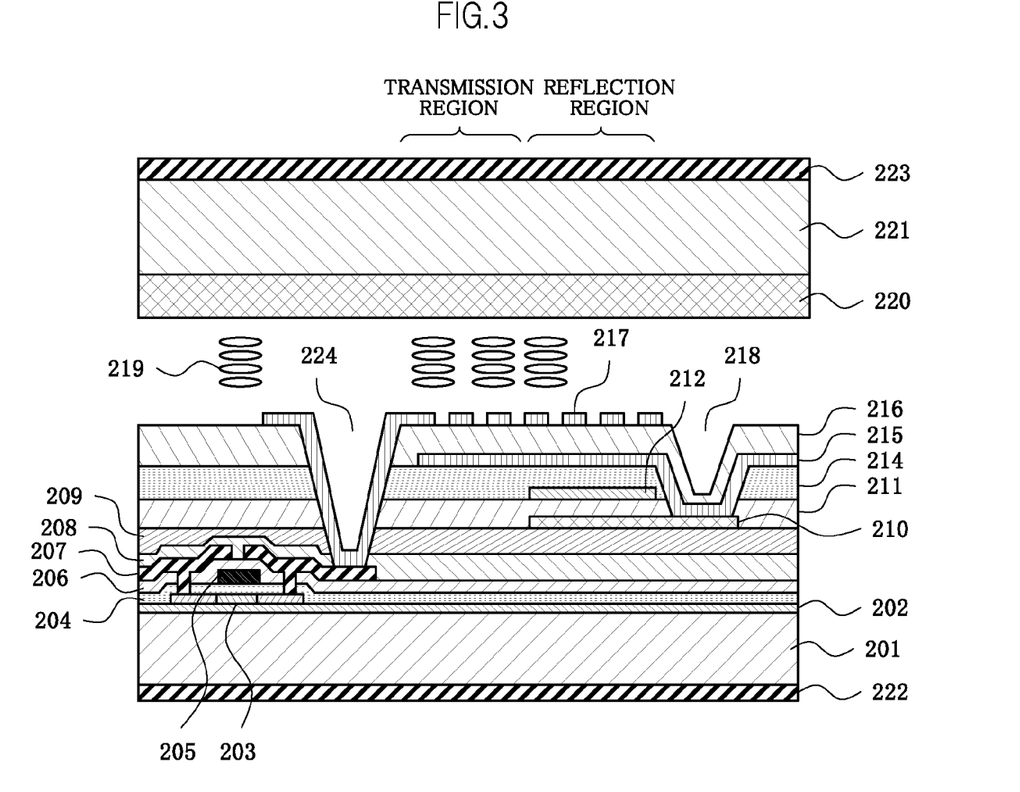
FIG. 3 is a pixel region cross-sectional view illustrating a liquid crystal display device according to the present invention.

FIG. 3 is a view illustrating a configuration of this embodiment (corresponding to a cross-sectional view taken along a line A-A of FIG. 1).

This embodiment has a configuration similar to that of First Embodiment, except that the polarizing layer 212 is formed only in a desired place, and the third insulating layer 214 is used as the protective film of the polarizing layer 212.

Regarding the formation step similar to that of First Embodiment, the description thereof is omitted, and only the step of forming the underlying layer 211 to the step of forming the third insulating layer 214 are described.

In the case where the underlying layer 211 is made of an organic polymer, before the polarizing layer 212 is applied, the surface of the organic polymer layer that is the underlying layer 211 is exposed to, for example, oxygen plasma, whereby oxidation treatment is conducted. Further, for example, a silane coupling material is applied to the surface of the organic polymer layer and sintered, whereby a layer with a siloxane structure is formed.

Herein, the oxidation treatment is conducted only in a region in which the polarizing layer 212 is desired to be formed with a desired mask. Next, the polarizing layer 212 is applied with a slit die coater.

At this time, in a region in which the surface of the underlying layer 211 is not subjected to oxidation treatment, the polarizing layer 212 is not formed. Next, the third insulating layer 214 is formed so as to cover an entire region in which the polarizing layer 212 and the reflective plate 210 are not present.

After that, the same steps as those of First Embodiment are performed.

Through the above-mentioned steps, a liquid crystal display device having a cross-section illustrated in FIG. 3 can be obtained.

Third Embodiment

Figure 4:
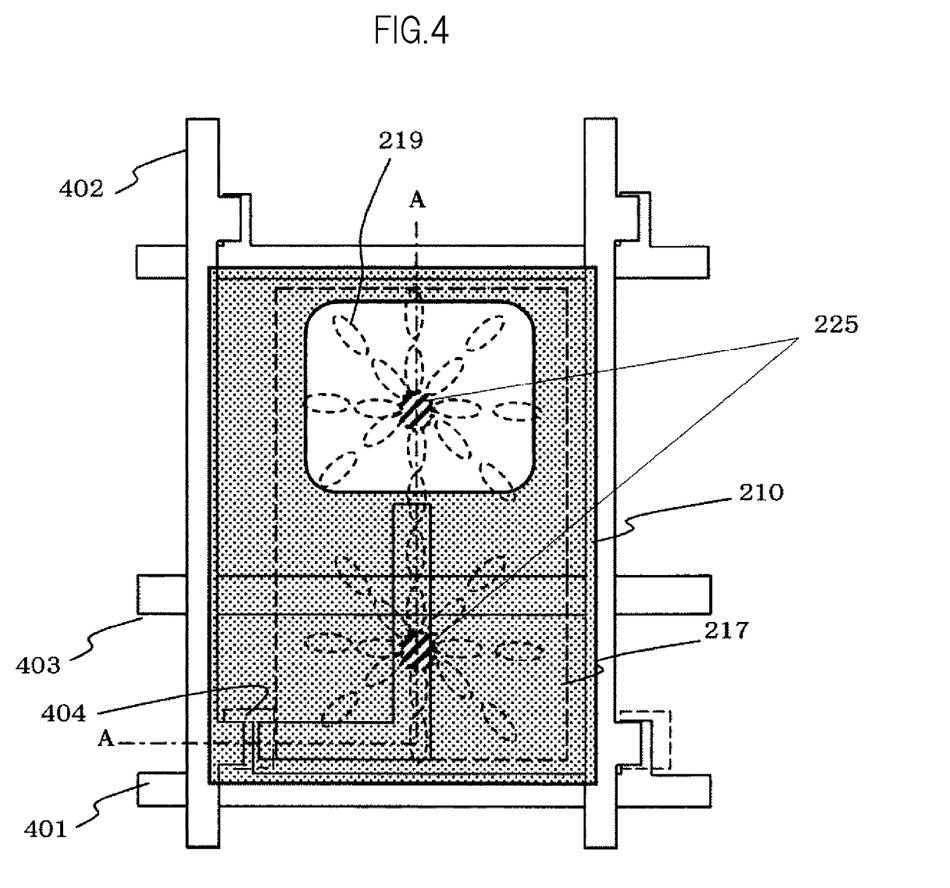
FIG. 4 is a pixel region plan view illustrating a liquid crystal display device according to the present invention.
Figure 5:
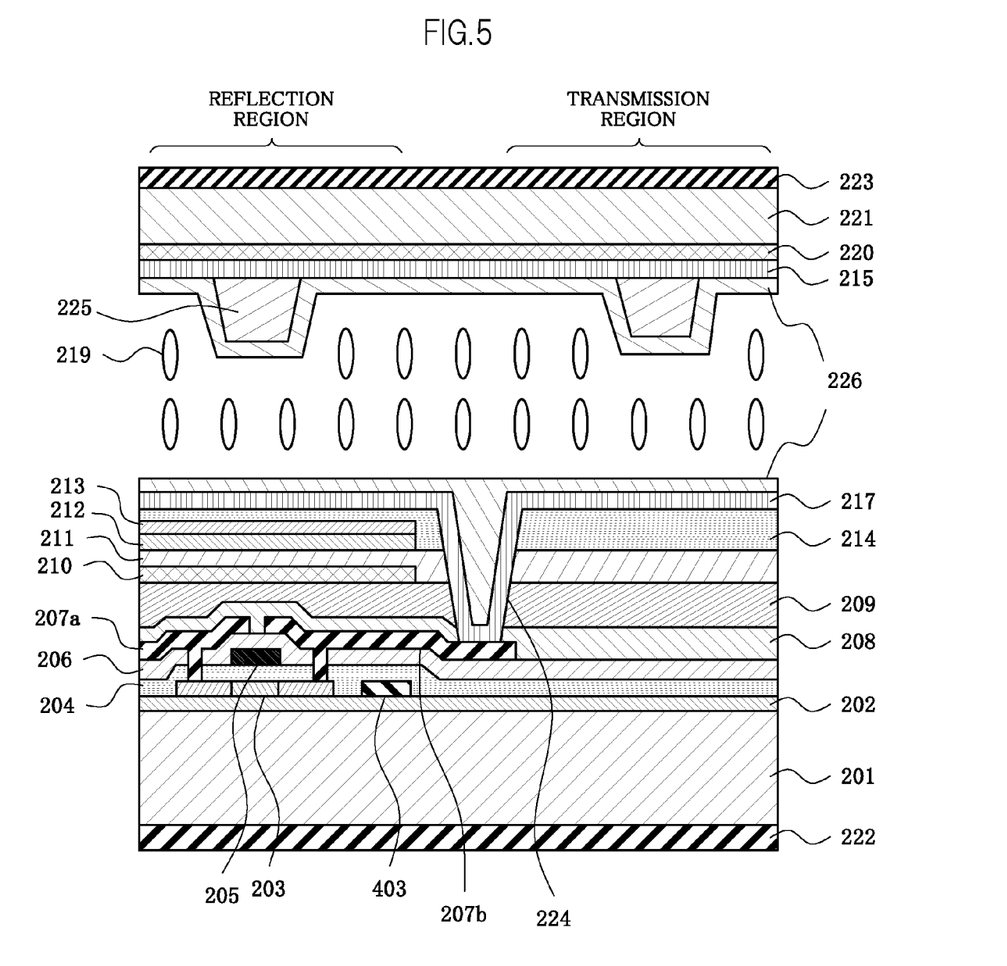
FIG. 5 is a pixel region cross-sectional view illustrating a liquid crystal display device according to the present invention.

As a modification of the above-mentioned liquid crystal display device, a transflective liquid crystal display device of a VA system according to the present invention is described with reference to FIGS. 4 and 5. FIG. 4 illustrates a plane structure of one pixel formed in the transflective liquid crystal display device of a VA system. FIG. 5 illustrates a cross-sectional structure (taken along a line A-A of FIG. 4) of the one pixel.

The transflective liquid crystal display device includes a first substrate 201, a second substrate 221 provided so as to be opposed to the first substrate 201, and a liquid crystal layer 219 provided so as to be interposed between the substrates.

The first substrate 201 includes a plurality of gate lines 401 provided so as to extend in parallel to each other, a plurality of source lines 402 provided so as to extend in parallel to each other in a direction perpendicular to the gate lines 401, capacitance lines 403 provided so as to extend in parallel to the gate lines between the respective gate lines 401, TFTs 404 provided in respective crossing portions between the gate lines 401 and the source lines 402, and pixel electrodes 217 made of transparent electrodes provided in display regions surrounded by the adjacent gate lines 401 and the adjacent source lines 402 so as to correspond to the respective TFTs 404.

The gate lines 401 and the capacitance lines 403 are provided between the first substrate 201 and the gate insulating layer 204. The gate line 401 includes a gate electrode 205 protruding in a direction in which the source line extends correspondingly to each TFT 404.

A semiconductor layer constituting the TFT 404 is provided between the gate insulating layer 204 and the first insulating layer 208, and in the semiconductor layer, the source line 402, a source electrode 207a protruding in a direction in which the gate line 401 extends from the source line 402 correspondingly to each TFT 402, and a drain electrode 207b opposed to the source electrode 207a are provided.

Pixel electrodes 217 are provided on the third insulating layer 214.

An alignment film 226 is provided on the pixel electrodes 217.

In the first substrate 201, the TFT 404 includes the gate electrode 205, the gate insulating layer 204, the semiconductor layer 203, the source electrode 207a, and the drain electrode 207b. The reflective plate 210 reflects external light to use the reflected light for a display. In addition, the reflective plate 210 is positioned in an upper layer of the TFT 404, and also functions as a light-shielding film which blocks external light incident upon the TFT 404. Thus, the generation of a leakage current caused by the light of the TFT 404 can be suppressed.

The counter substrate 221 is a multi-layered substrate in which the color filter layer 220, the common electrode 215, and the alignment film 226 are laminated in the stated order. Then, protrusions 225 are provided so as to correspond to the reflective plate 210 and the pixel electrodes 217 between the common electrode 215 and the alignment film 226.

Herein, the protrusions 225 are used for forming an alignment center under the application of a voltage in each transmission portion and reflection portion.

Specifically, when a voltage is not applied to the liquid crystal layer, it is considered that only liquid crystal molecules 219 in the vicinity of each protrusion 225 are aligned so as to be inclined in a radial manner with respect to the protrusion 225, and liquid crystal molecules located away from each protrusion 225 are aligned so as to be substantially perpendicular to the substrate surface. Further, when a voltage is applied to the liquid crystal layer, it is considered that the liquid crystal molecules located away from each protrusion 25 are also aligned to the above-mentioned radially inclined alignment. Then, due to such an alignment of liquid crystal molecules, a viewing angle at a display of an image is enlarged.

In the transflective liquid crystal display device, one pixel is configured for each pixel electrode. In each pixel, when a gate signal is sent from the gate line 401 to turn on the TFT 404, a source signal is sent from the source line 402 to write a predetermined charge in the pixel electrode 217 via the source electrode region and the drain electrode region, and a potential difference is caused between the pixel electrode 217 and the common electrode 215, whereby a predetermined voltage is applied to the liquid crystal layer.

In the transflective liquid crystal display device, when a voltage is applied to the liquid crystal layer, liquid crystal molecules of the liquid crystal layer aligned substantially perpendicular to the substrate surface are aligned in parallel to the substrate surface and in a radial manner with respect to the protrusion 225. Then, the transmittance of light is adjusted to display an image, utilizing the fact that the alignment state of the liquid crystal molecules 219 varies depending upon the magnitude of the applied voltage.

Next, a method of manufacturing a transflective liquid crystal display device according to this embodiment is described. The TFTs 404 are formed on the first substrate 201 in the same way as in First Embodiment. In Third Embodiment, since a transflective liquid crystal display device of a VA system is used, and thus the common line 103 and the common electrode 109 of the first substrate of Embodiment are not present.

Next, in the same way as in First Embodiment, the reflective layer 210 is formed, and the underlying layer 211, the polarizing layer 212, and the protective layer 213 are laminated on the reflective layer 210 in the stated order. The first insulating layer 208 and the second insulating layer 209 are formed.

Next, a third insulating layer 214 is formed so as to cover the entire region devoid of the protective layer 213 and the reflective plate 210. For the third insulating layer 214, a material transparent to visible light is suitable, and a polyimide-based or acrylic transparent resin material, other commercially available photosensitive polymer material, or a transparent inorganic material such as silicon oxide or silicon nitride can be used.

Next, the through-hole 224 for connecting the pixel electrode 217 to the drain electrode 207b is formed. In the case of forming first through-hole, for example, by photolithography, a transparent photosensitive resist material is used as a resist material, and the resist material is left on the protective layer 213 even after the formation of the through-hole 224, whereby the third insulating layer 214 may be formed. In this case, there is an effect that the number of steps can be decreased.

Next, the pixel electrode 217 is formed. The pixel electrode 217 is preferably formed of a transparent conductive material. For the pixel electrode 217, for example, indium tin oxide (ITO) is preferred, and other transparent conductive materials such as InZnO and ZnO can also be used. Those materials have a high electric conductivity to some degree, and have a function of transmitting visible light. Further, the pixel electrode 217 is connected to the electrode layer 207b constituting the switching element through a through-hole 224 passing through the pixel electrode 217, the third insulating layer 214, the underlying layer 211, the second insulating layer 209, and the first insulating layer 208. The through-hole 224 is directly filled with the same conductive material as that of the pixel electrode 217. Alternatively, in order to ensure the electric connection of the electrode material constituting the electrode layer 207b and the pixel electrode 217, an intermediate layer made of a conductive material (not shown) may be provided.

Next, a liquid crystal alignment film made of, for example, a polyimide resin is formed on the pixel electrodes 217 over the entire surface of the substrate.

As a counter substrate, a substrate in which the color filter layer 220 is formed on the second substrate 221 is prepared. In an upper layer of the color filter layer 220, an overcoat layer (not shown) coated with an acrylic resin is formed. Then, for example, an ITO film is formed on the overcoat layer over the entire surface of the substrate to form the common electrode 215. It is desired that the common electrode 215 be formed of a transparent conductive material in a similar manner to that of the pixel electrodes 217.

Then, for example, a photosensitive acrylic resin is applied onto the common electrode 215 over the entire surface of the substrate, and is patterned so as to correspond to a reflection display portion and a transmission display portion located on the first substrate by photolithography, whereby the protrusions 225 are formed.

Herein, instead of forming the protrusions on the common electrode 215, a hole may be formed in the ITO film at a position corresponding to the protrusion 225, or a hole may be formed in the corresponding pixel electrode 217 on the first substrate.

Next, a liquid crystal alignment film made of, for example, a polyimide resin is formed on the protrusions 225 over the entire substrate of the surface. The liquid crystal layer 219 is interposed between the first substrate and the second substrate thus formed to form a liquid crystal cell.

The external polarizing plates 222, 223 are attached to both outer surfaces of the substrates of the liquid crystal cell, and combined with a backlight unit (not shown) to be a light source, whereby a liquid crystal display device of a VA system illustrated in FIGS. 4 and 5 can be obtained.

The liquid crystal display device includes both a transmission portion that transmits backlight to be used for a display and a reflection portion that reflects external light inside to be used for a display.

Some embodiments have been described above. Next, the invention of the present application is described more specifically by way of examples. It should be noted that the invention of the present application is not limited to the following examples.

Example 1

First, the effect of the underlying surface of the polarizing layer on the optical properties of the polarizing layer is described.

The chromonic liquid crystalline material forming the polarizing layer is a kind of a lyotropic liquid crystal, which exhibits properties different from those of an amphiphile that is well-known as a low-molecular based lyotropic mesogen. A typical amphiphile as a lyotropic mesogen contains bar-shaped molecules, in which a non-polar group is a flexible alkyl group and a polar group is placed in a molecular head portion. On the other hand, a chromonic mesogen contains molecules in a disk shape or a plate shape, and has a molecular structure that is stiff as a whole, in which a non-polar group is a stiff aromatic ring, and one or a plurality of polar groups are placed on the periphery of the molecules. In an aqueous solution, aromatic rings are laminated due to a $\pi$-$\pi$ interaction to form a column association. At this time, due to one or a plurality of polar groups placed on the periphery of the molecule, the column exhibits the property of adsorbing to the surface of a solid substrate.

Table 1 illustrates a dichroic ratio of the polarizing layer made of chromonic liquid crystalline molecules formed on an organic polymer layer that is one underlying layer of the polarizing layer.

Herein, formation of an organic polymer layer serving as an underlying layer of the polarizing layer and surface treatment thereof were performed by the following step.

As an organic polymer layer serving as an underlying layer of the polarizing layer, TPAR manufactured by Tokyo Ohka Kogyo Co., Ltd. was applied by spin-coating, followed by heating at 90° C. for 5 minutes. Since TPAR was a photosensitive polymer, the entire surface of the TPAR was exposed to light to photolyze a photosensitizer and sintered by heating at 230° C. for 30 minutes, whereby an organic polymer layer serving as an underlying layer of the polarizing layer was obtained. Next, the surface of the organic polymer layer was subjected to oxidation treatment by oxygen ashing under the following conditions. Examples of the oxygen ashing conditions:

RF output: 800 W
Pressure: 1.0 Torr
Substrate temperature: 60° C.
Oxygen flow rate: 400 sccm
Treatment time: one minute.

Further, a layer having a silazane structure was formed by the following step.

OAP (hexamethyldisilazane) manufactured by Tokyo Ohka Kogyo Co., Ltd. was applied by spin-coating, followed by heating at 150° C. for 4 minutes, whereby a layer having a silazane structure was produced. The film thickness was 2.0 nm. Then, a solution made of a chromonic liquid crystal was applied with a slit coater and solidified by drying to form a polarizing layer. The thickness of the polarizing layer that was formed as a coating film was 230 nm.

The dichroic ratio was calculated by the following expression after determining a transmittance of the polarizing layer with a spectrophotometer with an iodine-based polarizing element placed in an incident optical system.

Dichroic ratio($D$)=ln(perpendicular transmittance)/ln (parallel transmittance)

Table 1 also illustrates the results obtained by determining a pure water contact angle of the underlying layer subjected to the above-mentioned surface treatment.

Comparative Example 1

An organic polymer layer serving as an underlying layer of the polarizing layer was formed through the same steps as those in Example 1. Then, an attempt was made so as to form a polarizing layer in the same way as in Example 1 without performing the surface treatment. However, when a solution made of a chromonic liquid crystal was applied, the solution was rejected by the underlying surface, with the result that the polarizing layer was not formed as a coating film (see Table 1).

Comparative Example 2

An organic polymer layer serving as an underlying layer of a polarizing layer was formed through the same steps as those in Example 1. Then, the surface of the organic polymer layer was subjected to oxidation treatment by oxygen ashing in the same way as in Example 1. Next, a polarizing layer was formed in the same way as in Example 1 without performing surface treatment. The thickness of the polarizing layer that was formed as a coating film was 230 nm. A dichroic ratio and a pure water contact angle were determined in the same way as in Example 1 (see Table 1).

Comparative Example 3

An organic polymer layer serving as an underlying layer of a polarizing layer was formed through the same steps as those in Example 1. Then, a layer having a silazane structure was produced without performing oxidation treatment. Specifically, an attempt was made so as to form a polarizing layer through the same steps as those in Example 1, except that an oxygen ashing step was not conducted. However, when a solution made of a chromonic liquid crystal was applied, the solution was rejected by the underlying surface, with the result that a polarizing layer was not formed as a coating film (see Table 1).

TABLE 1

| | Organic polymer layer surface treatment | Polarizing layer dichroic ratio | Pure water contact angle (°) |
|---|---|---|---|
| Example 1 | Oxidation treatment→ Formation of a layer having a silazane structure | 37 | 61 |
| Comparative Example 1 | None | Formation of a coating film impossible | 90 |
| Comparative Example 2 | Oxidation treatment | 29 | 10 |
| Comparative Example 3 | Formation of a layer having a silazane structure | Formation of a coating film impossible | — |

Thus, the following was made clear. In the case where the underlying surface of the polarizing layer was not subjected to surface treatment or in the case where only a layer having a silazane structure was formed, even a coating film was not formed. However, oxidation treatment was performed, and further, a layer having a siloxane structure was produced, whereby a dichroic ratio of the polarizing layer became larger compared with the case of performing only an oxidation treatment. This phenomenon is caused by the following: oxidation treatment is performed and a layer having a silazane structure is formed to make the underlying surface hydrophilic, whereby the wettability of a solution made of a chromonic liquid crystal with respect to an underlying layer is enhanced, and an interaction is expressed between the polar group of the solution made of a chromonic liquid crystal and the underlying layer due to the layer having a siloxane structure. Thus, a dichroic ratio becomes larger in the case of forming a layer having a siloxane structure, compared with the case of performing oxidation treatment.

The material and process for forming an underlying layer, the oxidation treatment conditions of the underlying surface, and the material and process for forming the layer having a silazane structure are not limited to the examples described above.

Example 2

Table 2 illustrates a dichroic ratio of a polarizing layer obtained by subjecting the surface of an organic polymer layer that is one of underlying layers of the polarizing layer to oxidation treatment to form a layer with a siloxane structure, and applying a solution made of a chromonic liquid crystal to the obtained layer.

Herein, an organic polymer layer serving as an underlying layer of the polarizing layer was formed by the step described in Example 1. The surface treatment of the organic polymer layer was performed by the following step. The surface of the organic polymer layer was subjected to oxidation treatment by oxygen ashing under the following conditions.

Examples of the oxygen ashing conditions
RF output: 800 W
Pressure: 1.0 Torr
Substrate temperature: 60° C.
Oxygen flow rate: 400 sccm
Treatment time: two minutes Further, a layer having a silazane structure was formed by the following step.

KBM-403 (3-glycidoxypropyltrimethoxysilane) manufactured by Shin-Etsu Chemical Co., Ltd. was applied by spin-coating, as a material for forming a layer with a siloxane structure, followed by heating at 110° C. for 5 minutes, whereby a layer with a siloxane structure was manufactured. The film thickness was 2.9 nm.

Next, a solution made of a chromonic liquid crystal was applied with a slit coater and solidified by drying, whereby a polarizing layer was obtained. The thickness of the polarizing layer that was formed as a coating film was 250 nm. A dichroic ratio and a pure water contact angle were calculated and determined in the same way as in Example 1.

Example 3

A polarizing layer was formed through the same steps as those in Example 2, except for using KBE-403 (3-glycidoxypropyltrimethoxysilane) manufactured by Shin-Etsu Chemical Co., Ltd. as a material for forming a layer with a siloxane structure, and a dichroic ratio and a pure water contact angle were calculated and determined (see Table 2). The film thickness of the layer with a siloxane structure was 2.5 nm.

Example 4

A polarizing layer was formed through the same steps as those in Example 2, except for using KBE-903 (3-aminopropyltrimethoxysilane) manufactured by Shin-Etsu Chemical Co., Ltd. as a material for forming a layer with a siloxane structure, and a dichroic ratio and a pure water contact angle were calculated and determined (see Table 2). The film thickness of the layer with a siloxane structure was 23.8 nm.

Example 5

An organic polymer layer serving as an underlying layer of the polarizing layer was formed by the step described in Example 2. Next, as a material forming a layer with a silazane structure, OAP (hexamethyldisilazane) manufactured by Tokyo Ohka Kogyo Co., Ltd. was applied by spin-coating, followed by heating at 150° C. for 4 minutes, whereby a layer having a siloxane structure was manufactured. The film thickness was 1.6 nm. Next, a polarizing layer was formed, and a dichroic ratio and a pure water contact angle were calculated and determined in the same way as in Example 2 (see Table 2).

Comparative Example 4

A polarizing layer was formed through the same steps as those in Example 2, except for the step of forming a layer with a siloxane structure or a silazane structure, and a dichroic ratio and a pure water contact angle were calculated and determined (see Table 2).

TABLE 2

|  | Material for forming a layer with siloxane structure or silazane structure | Dichroic ratio | Pure water contact angle (°) |
| --- | --- | --- | --- |
| Example 2 | KBM-403 | 32 | 59 |
| Example 3 | KBE-403 | 31 | 66 |
| Example 4 | KBE-903 | 34 | 59 |
| Example 5 | OAP | 31 | 62 |
| Comparative Example 4 | None | 28 | 8 |

It was clarified from the above that a dichroic ratio becomes larger in the case of forming a layer with a siloxane structure or a silazane structure, compared with the case of not forming a layer with a siloxane structure or a silazane structure.

The material and process for forming an underlying layer, the oxidation treatment conditions for an underlying surface, and the material and process for forming a layer with a siloxane structure or a silazane structure are not limited to the above-mentioned experiment.

Example 6

As an underlying layer of a polarizing layer, OCD Type-12 (hydroxysiloxane polymer) manufactured by Tokyo Ohka Kogyo Co., Ltd. was applied by spin-coating, followed by heating on a hot plate at 80° C., 150° C., and 200° C. and further curing at 400° C. for 30 minutes, whereby an inorganic insulating layer was manufactured. The film thickness was 250 nm. Next, a solution made of a chromonic liquid crystal was applied with a slit coater and solidified by drying, whereby a polarizing layer was obtained. The thickness of the polarizing layer that was formed as a coating film was 220 nm.

A dichroic ratio was calculated in the same way as in Example 1 and found to be 32.

It was clarified from the above that a dichroic ratio similar to that in the case of forming a layer with a siloxane structure or a silazane structure on an organic insulating film was obtained even on an inorganic insulating film with a siloxane structure. The material and process for forming an underlying layer are not limited to the examples described above.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device comprising:
   a liquid crystal layer interposed between a first substrate and a second substrate opposed to each other;
   a thin film transistor circuit as a switching element;
   a reflection display portion and a transmission display portion;
   a light-transparent pixel electrode and a light-transparent common electrode which are laminated above the first substrate via an insulating film, with the pixel electrode placed as an upper layer and the common electrode placed as a lower layer;
   a color filter formed on the second substrate;
   a non-light-transparent reflective plate formed under the common electrode in a reflection display region of the first substrate;
   an organic polymer layer formed on the reflective plate and having an oxidized surface;
   a layer having one of a siloxane structure and a silazane structure on a surface of the organic polymer layer;
   a polarizing layer made of chromonic liquid crystalline molecules between the common electrode and the reflective plate; and
   an organic insulating film covering the polarizing layer.

2. A liquid crystal display device according to claim 1, wherein the layer having one of a siloxane structure and a silazane structure on the surface of the organic polymer layer is made of one of a compound having a molecular structure of the following Formula (1) and a compound having a molecular structure of the following Formula (2):

$$X\text{—}C_nH_{2n}\text{—}OR \quad (1)$$

$$R'_3SiNHSiR'_3 \quad (2)$$

(where, in Formula (1), X represents an organic group selected from the group consisting of a vinyl group, an epoxy group, an amino group, a methacryl group, a mercapto group, a sulfide group, a ureide group, a methacryloxy group, an acryloxy group, and a ketimino group; R represents an organic group selected from the group consisting of a methyl group, an ethyl group, and an acetyl group; and n represents an integer of 1 to 3; In Formula (2), R' is a monovalent hydrocarbon group having 1 to 4 carbon atoms).

3. A liquid crystal display device comprising:
   a liquid crystal layer interposed between a first substrate and a second substrate opposed to each other;
   a thin film transistor circuit as a switching element;

a reflection display portion and a transmission display portion;

a light-transparent pixel electrode and a light-transparent common electrode which are laminated above the first substrate via an insulating film, with the light-transparent pixel electrode placed as an upper layer and the light-transparent common electrode placed as a lower layer;

a color filter formed on the second substrate;

a non-light-transparent reflective plate formed under the common electrode in a reflection display region of the first substrate;

an inorganic insulating film layer formed above the reflective plate;

a polarizing layer made of chromonic liquid crystalline molecules between the common electrode and the reflective plate; and an organic insulating film covering the polarizing layer.

4. A liquid crystal display device according to claim 3, wherein the inorganic insulating layer comprises a compound having one of a siloxane structure and a silazane structure.

5. A method of manufacturing a liquid crystal display device comprising a liquid crystal layer interposed between a first substrate and a second substrate opposed to each other, a thin film transistor circuit as a switching element, a reflection display portion and a transmission display portion, the method comprising:

laminating a light-transparent pixel electrode and a light-transparent common electrode above the first substrate via an insulating film, with the pixel electrode placed as an upper layer and the common electrode placed as a lower layer;

forming a color filter on the second substrate;

forming a non-light-transparent reflective plate under the common electrode in a reflection display region of the first substrate;

forming an organic polymer layer having an oxidized surface on the reflective plate;

forming a layer having one of a siloxane structure and a silazane structure on a surface of the organic polymer layer after oxidation treatment of the surface;

forming a polarizing layer by applying a solution made of a chromonic liquid crystal between the common electrode and the reflective plate followed by drying; and forming an organic insulating film covering the polarizing layer.

6. A method of manufacturing a liquid crystal display device comprising a liquid crystal layer interposed between a first substrate and a second substrate opposed to each other, a thin film transistor circuit as a switching element, a reflection display portion and a transmission display portion, the method comprising:

laminating a light-transparent pixel electrode and a light-transparent common electrode above the first substrate via an insulating film, with the pixel electrode placed as an upper layer and the common electrode placed as a lower layer;

forming a color filter on the second substrate;

forming a non-light-transparent reflective plate under the common electrode in a reflection display region of the first substrate;

forming an organic polymer layer with an oxidized surface above the reflective plate;

forming a layer having one of a siloxane structure and a silazane structure on a surface of the organic polymer layer after oxidation treatment of the surface;

forming a polarizing layer by applying a solution made of a chromonic liquid crystal between the common electrode and the reflective plate followed by drying; and forming an organic insulating film covering the polarizing layer;

wherein the forming a layer having one of a siloxane structure and a silazane structure on a surface of the organic polymer layer comprises applying one of a compound having a molecular structure of the following Formula (1) and a compound having a molecular structure of the following Formula (2):

$$X-C_nH_{2n}-OR \quad (1)$$

$$R'_3SiNHSiR'_3 \quad (2)$$

(where, in Formula (1), X represents an organic group selected from the group consisting of a vinyl group, an epoxy group, an amino group, a methacryl group, a mercapto group, a sulfide group, a ureide group, a methacryloxy group, an acryloxy group, and a ketimino group; R represents an organic group selected from the group consisting of a methyl group, an ethyl group, and an acetyl group; and n represents an integer of 1 to 3; In Formula (2), R' is a monovalent hydrocarbon group having 1 to 4 carbon atoms), followed by heating and drying.

7. A method of manufacturing a liquid crystal display device comprising a liquid crystal layer interposed between a first substrate and a second substrate opposed to each other, a thin film transistor circuit as a switching element, a reflection display portion and a transmission display portion, the method comprising:

laminating a light-transparent pixel electrode and a light-transparent common electrode above the first substrate via an insulating film, with the pixel electrode placed as an upper layer and the common electrode placed as a lower layer;

forming a color filter on the second substrate;

forming a non-light-transparent reflective plate under the common electrode in a reflection display region of the first substrate;

forming an inorganic insulating film layer above the reflective plate;

forming a polarizing layer by applying a solution made of a chromonic liquid crystal between the common electrode and the reflective plate followed by drying; and forming an organic insulating film covering the polarizing layer.

8. A method of manufacturing a liquid crystal display device according to claim 7, wherein the forming the inorganic insulating film layer comprises applying a solution made of a compound having one of a siloxane structure and a silazane structure followed by drying.

9. A liquid crystal display device comprising:

a transmission display portion and a reflection display portion which are formed for each pixel;

a first substrate having a principal surface opposed to a liquid crystal layer;

a second substrate opposed to the first substrate via the liquid crystal layer;

a light-transparent pixel electrode and a light-transparent common electrode which are laminated above the first substrate via an insulating film, with the pixel electrode placed as an upper layer and the common electrode placed as a lower layer;

a non-light-transparent reflective layer formed under the common electrode in a reflection display region of the first substrate; and a polarizing layer formed above the reflective layer via an underlying layer over the principal surface of the first substrate, the polarizing layer being made of chromonic liquid crystalline molecules;

wherein an interface between the polarizing layer and the underlying layer has one of a siloxane structure and a silazane structure.

10. A method of manufacturing a liquid crystal display device according to claim 5, wherein the forming a layer having one of a siloxane structure and a silazane structure on a surface of the organic polymer layer comprises applying one of a compound having a molecular structure of the following Formula (1) and a compound having a molecular structure of the following Formula (2):

$$X-C_nH_{2n}-OR \quad (1)$$

$$R'_3SiNHSiR'_3 \quad (2)$$

(where, in Formula (1), X represents an organic group selected from the group consisting of a vinyl group, an epoxy group, an amino group, a methacryl group, a mercapto group, a sulfide group, a ureide group, a methacryloxy group, an acryloxy group, and a ketimino group; R represents an organic group selected from the group consisting of a methyl group, an ethyl group, and an acetyl group; and n represents an integer of 1 to 3; In Formula (2), R' is a monovalent hydrocarbon group having 1 to 4 carbon atoms), followed by heating and drying.

* * * * *